(12) United States Patent
Qian et al.

(10) Patent No.: US 7,880,373 B2
(45) Date of Patent: Feb. 1, 2011

(54) FIELD EMISSION ELECTRON SOURCE AND METHOD FOR MAKING THE SAME

(75) Inventors: Li Qian, Beijing (CN); Liang Liu, Beijing (CN); Peng Liu, Beijing (CN); Jie Tang, Beijing (CN); Yang Wei, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1029 days.

(21) Appl. No.: 11/603,672

(22) Filed: Nov. 21, 2006

(65) Prior Publication Data

US 2007/0222356 A1    Sep. 27, 2007

(30) Foreign Application Priority Data

Mar. 31, 2006   (CN)   .................. 2006 1 0060128

(51) Int. Cl.
*H01J 1/304* (2006.01)
(52) U.S. Cl. .................. 313/311; 313/310; 313/495
(58) Field of Classification Search ......... 313/495–497, 313/309–311
See application file for complete search history.

(56) References Cited

U.S. PATENT DOCUMENTS

| 6,100,627 | A | * | 8/2000 | Carretti et al. ............... 313/309 |
| 7,365,482 | B2 | | 4/2008 | Ryu et al. |
| 7,385,344 | B2 | | 6/2008 | Hwang |
| 2001/0015604 | A1 | * | 8/2001 | Kerslick et al. ............. 313/310 |
| 2002/0074932 | A1 | * | 6/2002 | Bouchard et al. ........... 313/495 |
| 2003/0096543 | A1 | * | 5/2003 | Moore ......................... 439/894 |
| 2004/0169469 | A1 | | 9/2004 | Hasegawa |
| 2004/0195950 | A1 | * | 10/2004 | Ryu et al. .................... 313/311 |
| 2005/0236951 | A1 | | 10/2005 | Liu et al. |
| 2006/0197427 | A1 | * | 9/2006 | Chen ........................... 313/310 |
| 2007/0069631 | A1 | * | 3/2007 | Guo et al. .................... 313/497 |

FOREIGN PATENT DOCUMENTS

| CN | 1252613 | 5/2000 |
| CN | 1750222 A | 3/2006 |
| TW | 262561 | 11/1995 |
| TW | 289203 | 10/1996 |

* cited by examiner

*Primary Examiner*—Karabi Guharay
(74) *Attorney, Agent, or Firm*—Jeffrey T. Knapp

(57) ABSTRACT

A field emission electron source includes at least one electron emission member. Each electron emission member includes a conductive body and an electron emission layer formed on the conductive body. The conductive body has an upper portion. The electron emission layer is formed on, at least, the upper portion of the conductive body. The electron emission layer includes a glass matrix; and at least one carbon nanotube, and a plurality of metallic conductive particles and getter powders dispersed in the glass matrix. A method for making such field emission electron source is also provided.

10 Claims, 3 Drawing Sheets

FIELD EMISSION ELECTRON SOURCE AND METHOD FOR MAKING THE SAME

RELATED APPLICATIONS

This application is related to commonly-assigned applications entitled, "FIELD EMISSION PLANE LIGHT SOURCE AND METHOD FOR MAKING THE SAME", filed on Nov. 21, 2006 (U.S. application Ser. No. 11/603,639); "FIELD EMISSION LAMP AND METHOD FOR MAKING THE SAME", filed on Nov. 21, 2006 (U.S. application Ser. No. 11/601,628); "FIELD EMISSION LAMP AND METHOD FOR MAKING THE SAME", filed on Nov. 21, 2006 (U.S. application. Ser. No. 11/603,640); and "FIELD EMISSION DOUBLE-PLANES BACKLIGHT SOURCE AND METHOD FOR MAKING THE SAME", filed on Nov. 21, 2006 (U.S. application Ser. No. 11/603,627).

BACKGROUND

1. Technical Field

The invention relates generally to field emission electron sources and, particularly, to a carbon nanotube field emission electron source employing a getter to exhaust unwanted gas from therein, thereby ensuring a high degree of vacuum. The invention also relates to a method for making a field emission electron source.

2. Discussion of Related Art

Carbon nanotubes (also herein referred to as CNTs) are very small tube-shaped structures, each of which is essentially a graphite sheet in a tubular form. Carbon nanotubes have interesting and potentially useful electrical and mechanical properties and offer potential for various uses in electronic devices. Carbon nanotubes also feature extremely high electrical conductivity, very small diameters (much less than 100 nanometers), large aspect ratios (i.e., length/diameter ratios) (e.g., potentially greater than 1000), and a tip-surface area near the theoretical limit (the smaller the tip-surface area, the more concentrated the electric field, and the greater the field enhancement factor). These features tend to make carbon nanotubes ideal candidates for field emission electron sources.

Generally, a CNT field emission electron source includes a conductive base and at least one carbon nanotube formed on the conductive base. The carbon nanotube acts as an emitter of the field emission electron source. The methods adopted for forming the carbon nanotube on the conductive base mainly include mechanical methods and in-situ synthesis methods. One mechanical method is performed by placing a synthesized carbon nanotube on a conductive base using an Atomic force microscope (AFM) and then fixing the carbon nanotube on the conductive base via a conductive paste or other adhesives. The mechanical method is relatively easy to carry out. However, the precision and efficiency thereof are relatively low. Furthermore, the electrical connection between the conductive base and the carbon nanotube tends to be poor because of the limitations of the conductive paste used therebetween. Thus, the field emission characteristics of carbon nanotubes mounted in this manner are generally unsatisfactory.

One in-situ synthesis method is performed by coating metal catalysts on a conductive base and synthesizing a carbon nanotube directly on the conductive base by means of chemical vapor deposition (CVD). The in-situ synthesis method is relatively easily performed. Furthermore, the electrical connection between the conductive base and the carbon nanotube is typically good because of the direct engagement therebetween. However, the mechanical connection between the carbon nanotube and the conductive base often is relatively weak and thus tends to be unreliable. Thus, in use, such a carbon nanotube is apt, after a period of time, to break away from the conductive base due to the stress of the electric field force. Such breakage would damage the field emission electron source and/or decrease its performance. Furthermore, in the in-situ synthesis method, controlling of the growth direction of the carbon nanotube is difficult to achieve during the synthesis process. Thus, the production efficiency thereof is relatively low, and the controllability thereof is less than desired. Still furthermore, the in-situ synthesis method has a relatively high cost.

Additionally, in order for the field emission electron source to successfully emit electrons, a vacuum condition must be provided for the field emission electron source. Accordingly, a getter device is arranged beside/proximate the field emission electron source to exhaust the unwanted gas therearound to thereby ensure a high degree of vacuum to promote effective electron emission. This arrangement is a disadvantage as it increases the fabrication cost of the field emission electron source.

What is needed, therefore, is a field emission electron source that overcomes the above-mentioned shortcomings. The field emission electron source should, beneficially, have a better electrical connection and mechanical connection between a conductive base and a CNT thereof. Also, a high degree of vacuum, gained for a low fabrication cost, is desired for the field emission electron source, in order to ensure, in an economical manner, a better and more steady field emission performance during the use thereof.

What is also needed is a method for making such a field emission electron source.

SUMMARY

A field emission electron source generally includes at least one electron emission member, each electron emission member generally having a conductive body with an upper portion and an electron emission layer. The electron emission layer is formed on, at least, the upper portion of the conductive body. The electron emission layer includes a glass matrix; and at least one carbon nanotube and a plurality of metallic conductive particles and getter powders dispersed in the glass matrix.

A method for making a field emission electron source generally includes the steps of:

(a) providing at least one conductive body; at least one carbon nanotube; a plurality of metallic conductive particles, getter powders and glass particles (later melted to form a glass matrix);

(b) mixing the at least one carbon nanotube, the metallic conductive particles, the glass particles, and the getter powders in an organic medium to form an admixture;

(c) providing the admixture on, at least, an upper potion of the at least one conductive body; and (d) drying and then baking the admixture at a temperature of about 300° C. to about 600° C. to soften and/or melt the glass particles to result in the glass matrix with the at least one nanotube, the metallic conductive particles, and the getter powders dispersed therein, in order to yield an electron emission layer on, at least, the upper portion of the conductive body to thereby obtain an field emission electron source.

Other advantages and novel features of the present field emission electron source and the relating method thereof will become more apparent from the following detailed description of preferred embodiments when taken in conjunction with the accompanying drawings.

BRIEF DESCRIPTION OF THE DRAWINGS

Many aspects of the present field emission electron source and the related method for making such can be better understood with reference to the following drawings. The components in the drawings are not necessarily to scale, the emphasis instead being placed upon clearly illustrating the principles of the present field emission electron source and the related method for making such. Moreover, in the drawings, like reference numerals designate corresponding parts throughout the several views.

The exemplifications set out herein illustrate at least one preferred embodiment of the present field emission electron source and the related method for making such, in one form, and such exemplifications are not to be construed as limiting the scope of such a field emission electron source and/or a method for making such in any manner.

DETAILED DESCRIPTION

Reference will now be made to the drawings to describe, in detail, the field emission electron source 10 and the method for making the same, according to the present embodiment.

Figure 1:
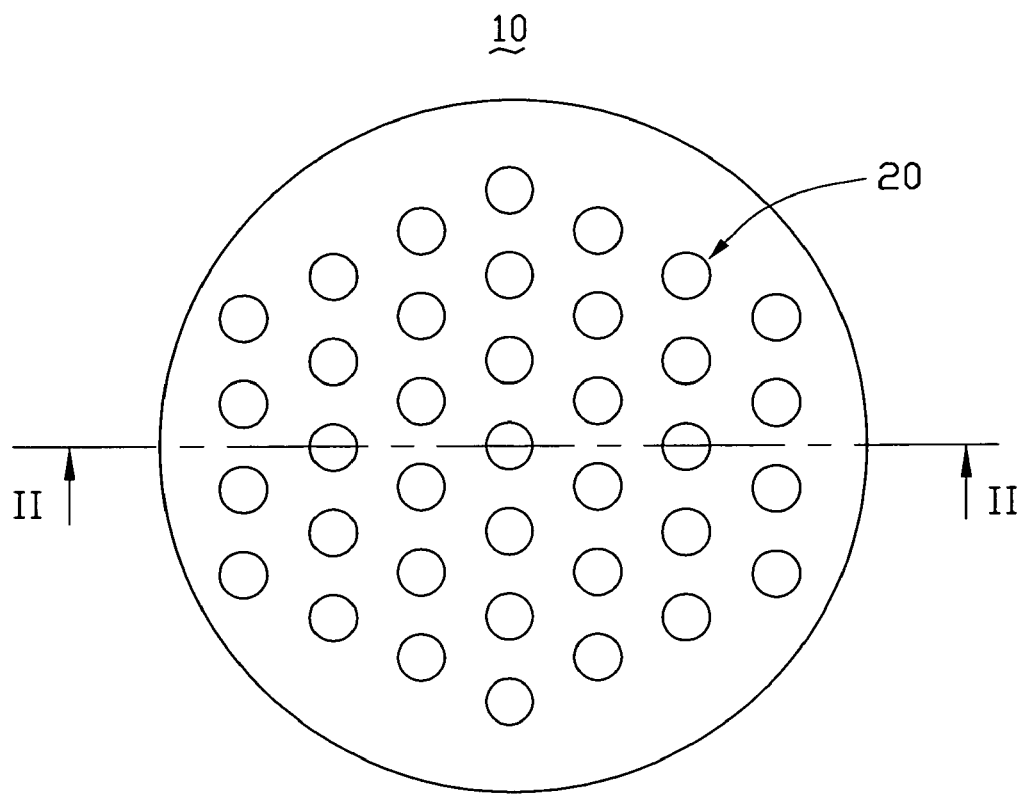
FIG. 1 is a top plane view of a field emission electron source, in accordance with an exemplary embodiment of the present device.
Figure 2:
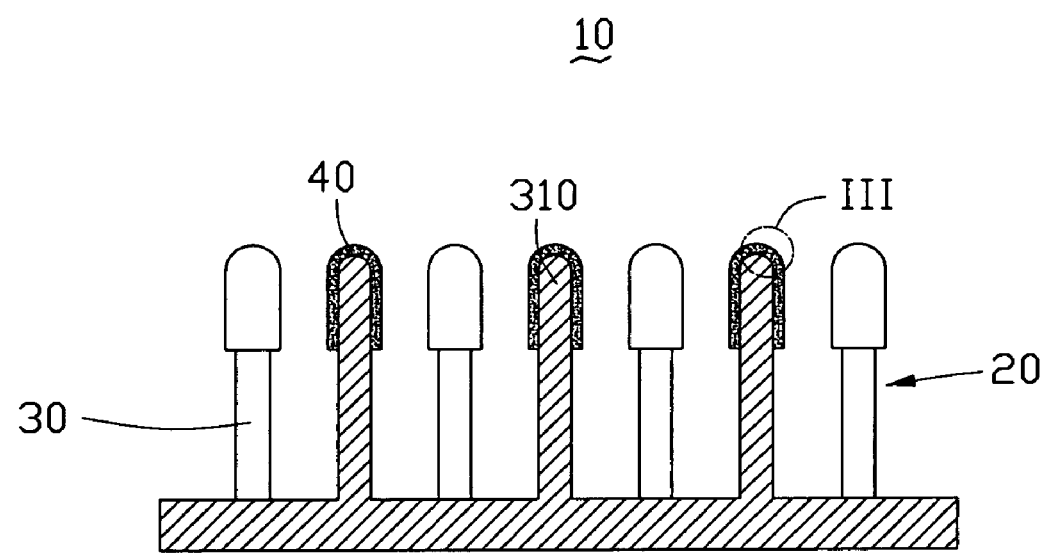
FIG. 2 is a cross-section view along a line II-II of FIG. 1.

Referring to FIGS. 1 and 2, a field emission electron source, in accordance with an exemplary embodiment of the present device, is provided. The field emission electron source 10 includes at least one electron emission member 20. When a plurality of the electron emission members 20 is needed, the electron emission members 20 could be disposed on a substrate (not labeled) separately or integrally and arranged in, e.g., a matrix manner. In FIG. 1, a plurality of electron emission members, arranged on a circular substrate and in a matrix manner/pattern, is shown.

Each electron emission member 20 includes a conductive body 30 and an electron emission layer 40 formed on the conductive body 30. The conductive body 30 is advantageously made of a conductive material, e.g., silver (Ag), copper (Cu), nickel (Ni), gold (Au), silicon, silicon oxide, etc. The conductive body 30 is arranged as, e.g., a tapered, a cone configuration, or a column configuration, and the cross section thereof has a circular shape, a triangular shape, a rectangular shape, or another shape, in accordance with a given application. The conductive body 30 includes an upper portion 310. The upper portion 310 can, e.g., be tapered, cone-shaped, column-shaped, or half ball-shaped, and an average size (i.e., diameter) of the cross section thereof is about in the range from 10 micrometers to 1000 micrometers. In FIG. 2, the conductive body 30 is arranged as a column configuration and has a half ball-shaped upper portion 310. By using conductive bodies 30 that extend from a substrate, the mechanical integrity of the connection of such a body with a substrate is generally easier to ensure, especially if the substrate is also made of metal. The conductive bodies 30 could, for example, be metallurgically attached (e.g., welded or soldered) or integrally formed with the base. The emission sources (i.e., nanotubes 410) are then, in turn, effectively attached to a respective conductive body 30 by being embedded in a glass solder (i.e., glass matrix 420). Accordingly, the present field emission electron source 10 advantageously has a high degree of mechanical durability, while still enjoying the favorable qualities associated with CNT emitters.

Figure 3:
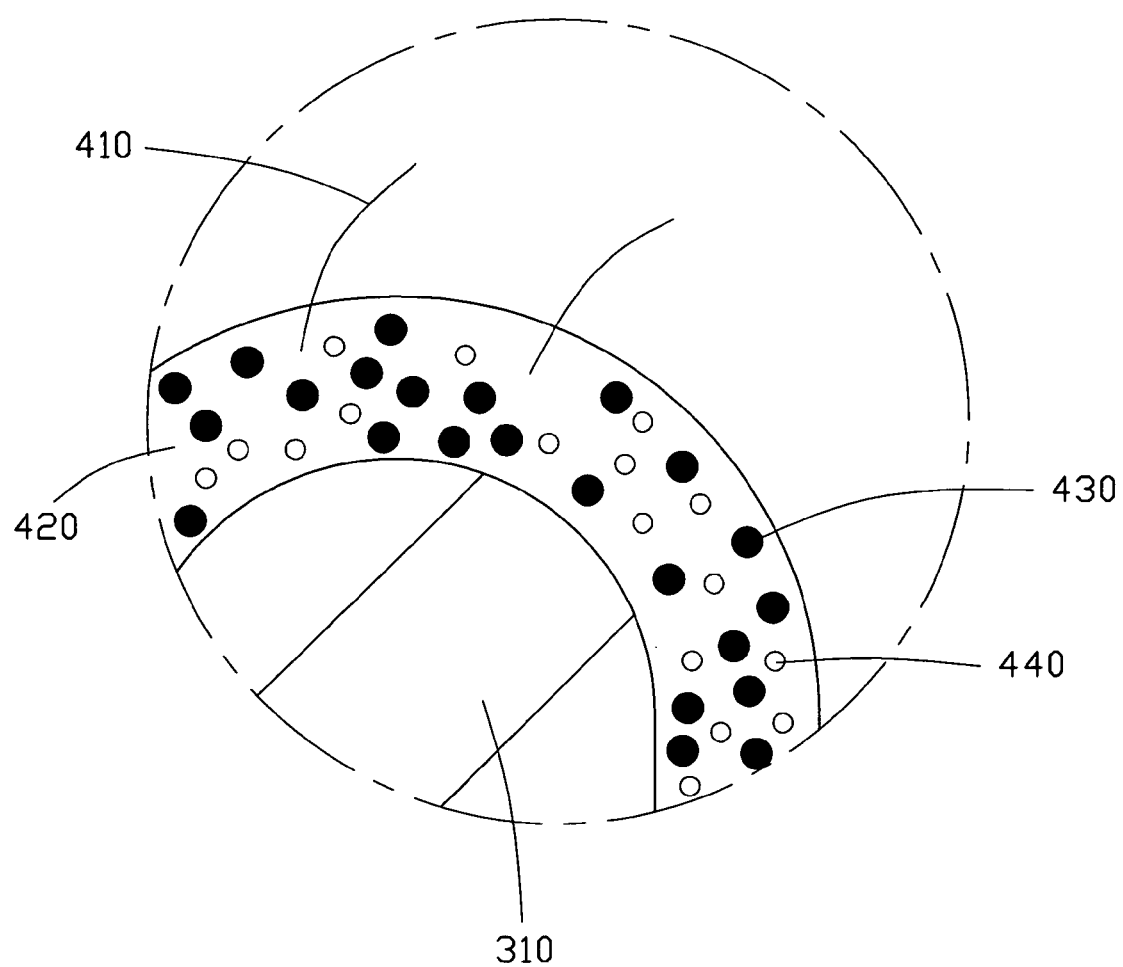
FIG. 3 is an enlarged view of a circled portion III of FIG. 2.

The electron emission layer 40 is, at least, formed on the upper portion 310 of the conductive body 30. Referring to FIG. 3, the electron emission layer 40 includes at least one nanotube 410 (two nanotubes 410 being shown in FIG. 3), a glass matrix 420, and a plurality of metallic conductive particles 430 and getter powders 440 dispersed in the glass matrix 420. Preferably, a length of the at least one nanotube 410 is in the range from about 5 micrometers to about 15 micrometers, and a diameter thereof is in the range from about 1 nanometer to about 100 nanometers. One end of the at least one nanotube 410 is, usefully, exposed out of (i.e., anchored within and extending therefrom) a top surface of the electron emission layer 40. The metallic conductive particles 430 are beneficially made of a material of silver (Ag) or indium tin oxide (ITO) and are used to electrically connect the conductive body 20 with the nanotube 410. More preferably, the metallic conductive particles 430 are made of Ag. The getter powders 440 are made of a non-evaporating getter material (i.e., a material generally selected from the group consisting of titanium (Ti), zirconium (Zr), hafnium (Hf), thorium (Th), aluminum (Al), thulium (Tm) and alloys substantially composed of at least two such metals). The average diameter of the getter powders 440 is, quite suitably, in the range from about 1 micrometer to about 10 micrometers.

The field emission electron source 10 of the present embodiment can be used in, e.g., an electron microscope, an X-ray tube, a microwave tube electron gun, a plane display device, or a solar transmission device, etc., to emit electrons in an electrical field.

A method for making the above-mentioned field emission electron source 10 generally includes:

(a) providing at least one conductive body 30; at least one carbon nanotube 410; a plurality of metallic conductive particles 430, getter powders 440, and glass particles (later melted to form a glass matrix 420);

(b) mixing the at least one carbon nanotube 410, the metallic conductive particles 430, the glass particles, and the getter powders 440 in an organic medium to form an admixture;

(c) providing the admixture on, at least, an upper potion of the at least one conductive body 30; and (d) drying and then baking the admixture at a temperature of about 300° C. to about 600° C. to soften and/or melt the glass particles to result in the glass matrix 420 with the at least one nanotube 410, the metallic conductive particles 430, and the getter powders 440 dispersed therein, in order to yield an electron emission layer 40 on, at least, the upper portion of the conductive body 30 to thereby obtain an field emission electron source 10.

In step (a), the at least one carbon nanotube 410 is formed by an appropriate technology (e.g., a chemical vapor deposition (CVD) method, an arc-discharge method, a laser ablation method, a gas phase combustion synthesis method, etc.). Preferably, the average length of each nanotube 410 is in the range from about 5 micrometers to about 15 micrometers. The glass particles are opportunely elected from glass powders with a low melting temperature (e.g., glass powders with a low melting temperature in the range of about 350° C. to about 600° C.; capable of bonding with graphite, a getter material, and a metal; and preferably composed, in part, of silicon oxide ($SiO_2$), boric trioxide ($B_2O_3$), zinc oxide (ZnO), and vanadium pentoxide ($V_2O_5$)). The average diameter of the glass particles is preferably in the range of about 10 nanometers to about 100 nanometers. The metallic conductive particles 430 are, beneficially, ball-milled, yielding particle diameters in the range from about 0.1 micrometer to about 10 micrometers. The getter powders 440 are, usefully, also ball-milled, yielding powder diameters in the range from about 1 micrometer to about 10 micrometers. Preferably, the getter powders 440 are made of a getter material with an activity temperature of about 300° C. to about 500° C. (e.g., an alloy containing Zr and Al).

In step (b), the organic medium is composed of a certain amount of solvent (e.g., terpineol, etc.), a smaller amount of a plasticizer (e.g., dimethyl phthalate, etc.) and a stabilizer (e.g., ethyl cellulose, etc.). The percent by mass of the getter powders 440 is in the range of about 40% to about 80% of the admixture. The process of mixing is preferably performed at a temperature of about 60° C. to about 80° C. for a sufficient period of time (e.g., about 3 hours to about 5 hours) and, more preferably, employing ultrasonic vibrations to promote dispersion.

Step (c) is performed in a condition of a low dust content (e.g., being preferably lower than 1000 mg/m$^3$).

In step (d), the process of drying volatilizes the organic medium from the at least one conductive body 30, and the process of baking melts or at least softens the glass particles to permit the flow thereof in order to form the glass matrix 420 of the electron emission layer 40. The processes of drying and baking are performed in a vacuum condition and/or in a flow of a protective/inert gas (e.g., noble gas, nitrogen). An outer surface of the electron emission layer 40 is advantageously abraded and/or selectively etched, in order to expose one end of the at least one nanotube 410. The exposure of such an end increases the field emission performance of the electron emission layer 40.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope thereof.

What is claimed is:

1. A field emission electron source comprising:
    a substrate; and
    a plurality of electron emission members provided on the substrate, wherein each of the electron emission members comprises:
        a conductive body perpendicular to the substrate, the conductive body having a free end portion and a root portion contacting with the substrate, the free end portion having a top end surface and a lateral periphery surface below the top end surface around the free end portion, and the root portion being partially exposed; and
        an electron emission layer provided on and contacting the top end surface and the lateral periphery surface of the free end portion, the electron emission layer comprising a glass matrix, a plurality of carbon nanotubes, a plurality of metallic conductive particles and getter powders, wherein the carbon nanotubes, the metallic conductive particles and the getter powders are dispersed in the glass matrix;
    wherein in each of the electron emission members, the free end portion together with the electron emission layer has a diameter larger than that of the root portion; wherein the conductive body and the electron emission members are made of different materials.

2. The field emission electron source as described in claim 1, wherein the carbon nanotubes are electrically connected to the conductive body by surrounding metallic conductive particles.

3. The field emission electron source as described in claim 1, wherein each of the electron emission members directly faces adjacent electron emission members.

4. The field emission electron source as described in claim 1, wherein in each of the electron emission members, the electron emission layer forms a shell over the free end portion.

5. The field emission electron source as described in claim 1, wherein the conductive body is partly covered by the electron emission layer.

6. The field emission electron source as described in claim 1, wherein the electron emission layer of each of the electron emission members is separated from both of the substrate and electron emission layers of adjacent electron emission members.

7. The field emission electron source as described in claim 1, wherein the conductive body is made of one of silver, copper, nickel, gold, silicon, and silicon oxide.

8. A field emission electron source comprising:
    an array of vertically oriented conductive bodies, each of the conductive bodies having a top end surface and a lateral periphery surface; and
    an electron emission layer provided on the top end surface and the lateral periphery surface of each of the conductive bodies, the electron emission layer comprising a glass matrix, a plurality of carbon nanotubes, a plurality of metallic conductive particles and getter powders, wherein the carbon nanotubes, the metallic conductive particles and the getter powders are dispersed in the glass matrix; wherein each of the conductive bodies is partly covered by the electron emission layer;
    wherein the electron emission layer provided on each of the conductive bodies is separated from electron emission layers provided on adjacent conductive bodies.

9. The field emission electron source as described in claim 8, wherein some of the carbon nanotubes which are attached to the lateral periphery surface of each of the conductive bodies directly face carbon nanotubes attached to lateral periphery surfaces of adjacent conductive bodies.

10. The field emission electron source as described in claim 8, wherein each of the conductive bodies is made of one of silver, copper, nickel, gold, silicon, and silicon oxide.

* * * * *